W. KRUG.
WHEEL RIM JACK.
APPLICATION FILED MAR. 28, 1921.

1,411,667.

Patented Apr. 4, 1922.

INVENTOR
William Krug

UNITED STATES PATENT OFFICE.

WILLIAM KRUG, OF DETROIT, MICHIGAN.

WHEEL-RIM JACK.

1,411,667.   Specification of Letters Patent.   Patented Apr. 4, 1922.

Application filed March 28, 1921. Serial No. 456,081.

*To all whom it may concern:*

Be it known that I, WILLIAM KRUG, a citizen of the United States, residing at Detroit, in the county of Wayne and State of Michigan, have invented a new and useful Improvement in Wheel-Rim Jacks, of which the following is a specification, reference being had to the accompanying drawing in explaining its nature.

Many of the pneumatic tires for automobiles are very stiff and resistant to manipulation and require a very considerable application of force in applying them to the rim and removing them therefrom. My invention has for its object a means whereby demountable rims for mounting these tires may be contracted in diameter, held securely in the contracted state, and forcibly enlarged to normal size although resisted by the tire; and consists in the improvements particularly pointed out in the appended claims.

Figure 1:
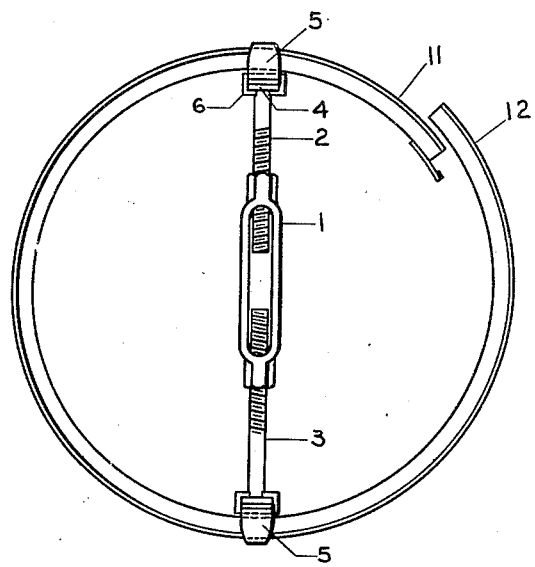
Figure 2:
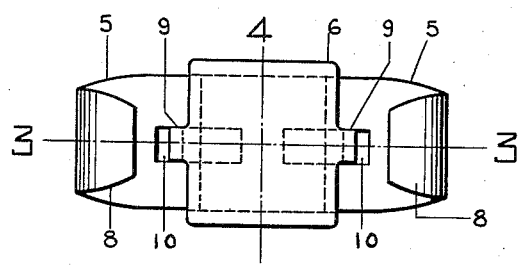
Figure 3:
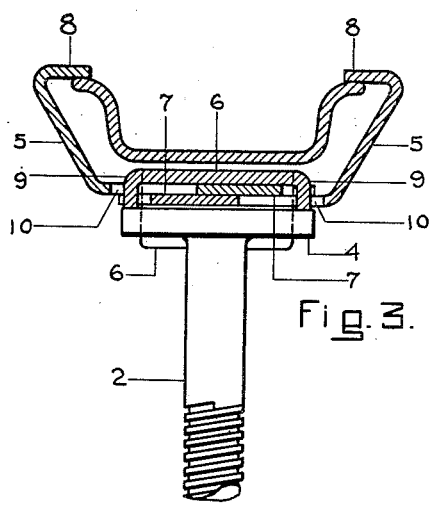
Figure 4:
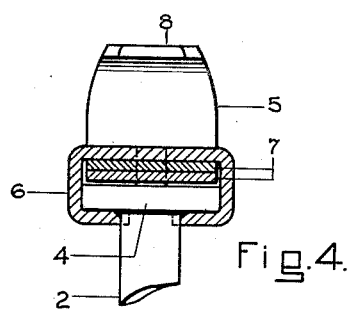

Referring to the drawing Fig. 1 is an elevation of a demountable rim showing a jack embodying my invention applied thereto, the rim being shown as held in the contracted position. Fig. 2 is an enlarged plan of the end of my device. Figs. 3 and 4 also enlarged are sections of the end portion of my device on the lines indicated on Fig. 2, the first of which also shows a section of rim in place.

The central member 1, of my device is a turnbuckle the ends of which are tapped to receive the right hand and left hand threaded hook-carriers 2 and 3. At their outer ends these hook carriers are formed with integral rectangular heads 4. A pair of hooks 5, 5 are carried upon each head supported and guided within the chamber formed above the head by a cap 6 which is preferably a formed steel stamping, tightly clinched about the same. The inner portions 7, 7 of the hooks are fitted to slide within the cap outwardly and inwardly as regards Fig. 3 and the outer ends are provided with lips 8, 8 adapted to engage the outer diameter of the rim.

The cap 6 is provided with two tongues which are bent at right angles to its body part forming short posts 9 which act as distance pieces determining the height of the chamber within the cap, and the slide portion 7 of the hooks is slotted to permit the posts 9 to pass through them, the length of the slot, 10, being sufficient to permit the hooks to move inwardly and outwardly sufficiently to engage the narrowest rim and to disengage and be free from the widest rim upon which it is desired to work.

In Fig. 1 the device is shown upon a demountable rim which it is holding in a contracted position the rim end 11 being displaced inwardly and underlapping the end 12.

In operation, for contracting a rim from its normal shape in which the rim ends 11 and 12 are together and flush; the turn buckle is rotated by hand upon the hook-carriers 2 and 3, till the overall length of device is reduced sufficiently for it to pass within the interior diameter of the rim, the hooks 5, 5 are separated by hand sufficiently to pass over the rim width, and the device placed within the rim in about the relation to the rim joint indicated, say 45 degrees therefrom, the turn buckle is then rotated in the opposite direction increasing the length of the device till the lips 8, 8 pass the outside diameter of the rim, the hooks 5, 5 are then moved inwardly bringing the lips 8, 8 over the outside of the rim as in Fig. 3, and the turn buckle rotated to shorten the device upon which the lips 8, 8, draw inwardly on the rim causing the rim end 11 to slip inwardly on the end 12 and on a continuance of the rotation to pass by and underlap it.

The device exerts its pressure equally on both sides of the rim so there is no tendency for the rim to warp and displace the ends sidewise, that is the rim remains flat as to its sides. Because of the non-reversible character of the screw the device will retain the rim in the contracted shape permitting any manipulation desired. Upon rotating the turn buckle in the reverse direction the rim will spring back toward its normal shape and if the ends are restrained from meeting properly as by tire resistance, the cap 6 will come in contact with the inside of the rim and on a continuation of the rotation forcibly expand the same till they are free to do so.

The turn buckle is provided with a central opening through which any convenient form of lever may be applied if it is desired to use more force than can be applied by hand. For convenience I make the screws of the hook carriers rather quick-acting say with a lead of ¼ inch and double thread. I make hooks 5, 5 of steel stamping as well as the yoke 6.

What I claim and desire to secure by Letters Patent is:

1. In a wheel rim jack, a turn buckle, screw rods engaging said turn buckle and provided on their outer ends with flat ended laterally extended heads, cap pieces spaced above said heads by integral tongues or distance pieces, and pairs of rim clamping jaws having wide guiding extensions sliding between the caps and heads.

2. In a wheel rim jack, a turn buckle, screw rods engaging said turn buckle and provided on their outer ends with flat ended laterally extending heads, cap pieces spaced above said heads by integral tongues or distance pieces, and pairs of rim clamping jaws having wide guiding extensions sliding between the caps and heads, said guiding extensions having longitudinal slots about the said tongues.

WILLIAM KRUG.